United States Patent Office 3,152,183
Patented Oct. 6, 1964

3,152,183
SULFUR-CONTAINING BENZYLAMINO COMPOUNDS
Leslie G. Humber, Montreal, Quebec, Canada, assignor to American Home Products Corporation, New York, N.Y., a corporation of Delaware
No Drawing. Filed June 21, 1962, Ser. No. 204,090
9 Claims. (Cl. 260—570.5)

This invention relates to new sulfur-containing organic chemical compounds having biological activities. It is also concerned with the chemical process by which the new compounds may be prepared from readily-available starting materials.

More particularly, this invention is directed to chemical compounds of the structural formula

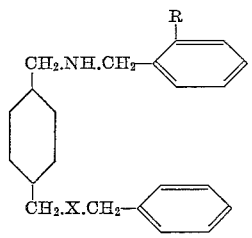

wherein X represents a radical selected from the group consisting of —S—, —SO— and —SO$_2$—; and R represents hydrogen or a halogen substituent such as chloro.

My invention also includes salts of these compounds with nontoxic, pharmacologically-acceptable acids, particularly acid addition salts with hydrohalic acids such as hydrochloric acid, and hydrobromic acid.

Among novel chemical compounds within the scope of my invention may be mentioned sulfides, and oxidation products thereof, such as:

1-benzylaminomethyl, 4-benzylthiomethylcyclohexane (Compound I);
1-benzylaminomethyl, 4-benzylthiomethylcyclohexane, S-oxide (Compound II);
1-benzylaminomethyl-4-benzylsulfonylmethylcyclohexane (Compound III)
and
1-benzylthiomethyl, 4-(o-chlorobenzylaminomethyl)-cyclohexane (Compound IV).

In the type of formula given for my novel chemical compounds, in base form, the substituents X and R in these compounds are as follows:

| Compound | X | R |
|---|---|---|
| I | —S— | H |
| II | —SO— | H |
| III | —SO$_2$— | H |
| IV | —S— | Cl |

The hydrohalide salts, particularly the hydrochloride salts, of these compounds, as well as the bases, are characterized by possessing biological activities, which are set forth more fully below.

In preparing the new chemical compounds the following methods of synthesis were employed. Compound I, 1-benzylaminomethyl, 4 - benzylthiomethylcyclohexane; and Compound IV, 1-benzylthiomethyl, 4-(o-chlorobenzylaminomethyl)-cyclohexane; may be prepared by an identical series of reactions, using as starting materials 4-aminomethylcyclohexanemethanol and either benzaldehyde or o-chlorobenzaldehyde. Thus: 4-aminomethylcyclohexanemethanol and one molar equivalent of the appropriate benzaldehyde may be converted to the corresponding Schiff base by refluxing in benzene. It may then be reduced to the corresponding amine derivative with sodium borohydride. The resulting 4-benzylaminomethylcyclohexanemethanol may then be converted to the chloromethyl derivative with thionyl chloride. Condensation of the chloromethyl derivative with α-toluenethiol in the presence of sodium hydroxide yields the benzylthiomethyl derivatives.

The benzylthiomethyl derivative when R is hydrogen (Compound I) may be oxidized with sodium metaperiodate to yield the corresponding sulfoxide (Compound II). Oxidation of the hydrochloride salt of the benzylthiomethyl derivative with hydrogen peroxide, followed by regeneration of the free base, results in the corresponding sulfone, Compound III.

This sequence of chemical reactions may be indicated schematically as follows:

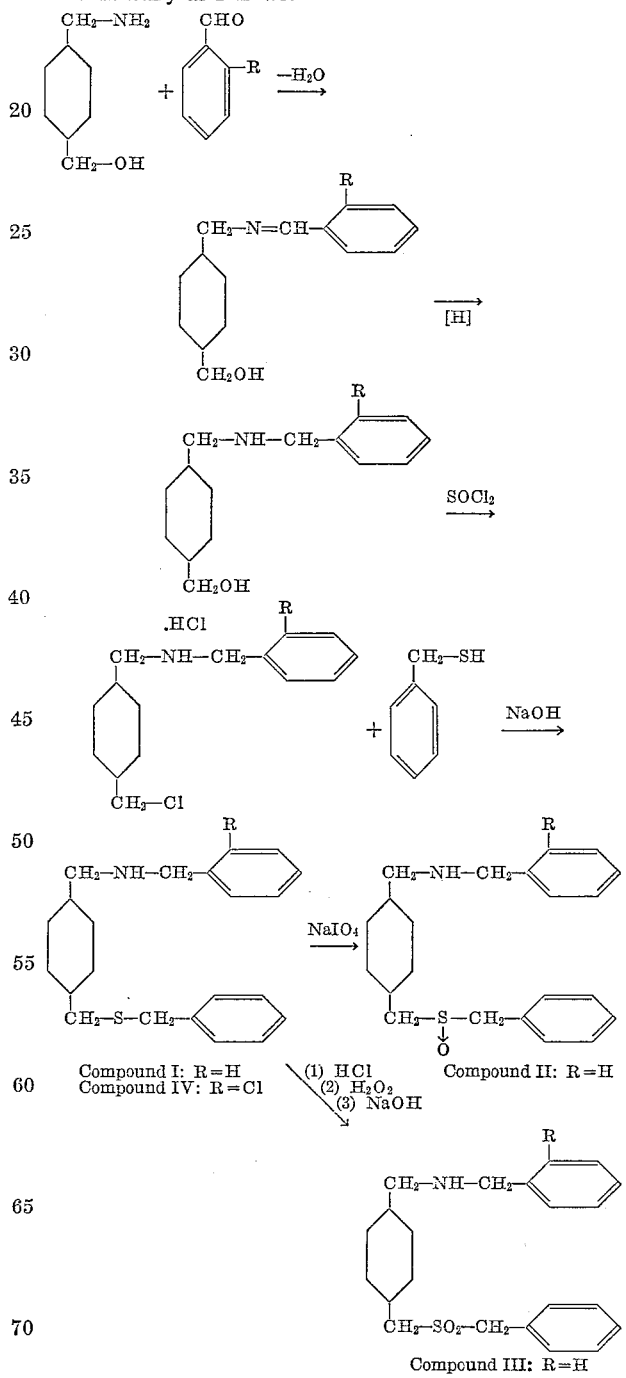

The new chemical compounds possess utility in the fields of cholesterol lowering agents, i.e. effective to lower the levels of cholesterol in the blood, and as antibacterial agents.

Thus, 1-benzylaminomethyl, 4-benzylthiomethylcyclohexane acts to lower cholesterol levels in the rat by 27 percent at an oral dose level of 75 micromoles per kilogram of rat body weight.

The compound 1-benzylaminomethyl, 4-benzylsulfonylmethylcyclohexane (III), as well as 1-benzylthiomethyl, 4-(o-chlorobenzylaminomethyl)-cyclohexane (IV), are antibacterial agents. The activity of these two compounds at dilutions of 1 part of the compound in the specified quantity of aqueous liquid, against various microorganisms is shown in the following table.

ANTIBACTERIAL ACTIVITY

| Microorganisms | 1,Benzyl-aminomethyl, 4-benzylsulph-onylmethyl cyclohexane | 1-Benzylthio-methyl, 4-(o-chlorobenzyl-aminomethyl)-cyclohexane |
| --- | --- | --- |
| Staph. pyogenes S | 1,000 | 40,000 |
| Staph. pyogenes R |  | 40,000 |
| Sarcina lutea | 1,000 | 160,000 |
| E. coli 198 | 1,000 | 8,000 |
| Pr. mirabilis |  | 10,000 |
| Strep. faecalis | 2,000 |  |
| S. pullorum | 4,000 |  |

The compound 1-benzylaminomethyl, 4-benzylthiomethylcyclohexane, S-oxide is chiefly useful as an intermediate for the production of 1-benzylaminomethyl, 4-benzylsulfonylmethylcyclohexane as, by any of a number of well known methods, sulfoxides may be oxidized to sulfones.

The following examples illustrate my invention.

Example 1
4-BENZYLAMINOMETHYLCYCLOHEXANEMETHANOL 4-aminomethylcyclohexanemethanol (42.9 g.) and benzaldehyde (31.8 g.) were refluxed in benzene solution until the theoretical quantity of water had been removed azeotropically. The resulting Schiff base, λmax. 247 mμ (ε=17,800), was dissolved in methanol and reduced by adding sodium borohydride (11.4 g.) portionwise. After refluxing for three hours, the methanol was removed in vacuo, i.e., at a pressure below atmospheric pressure, and the residue distributed between water and ether. The ether layer yielded the title product in 92% yield. It had λmax. 259 mμ (ε=267). The hydrochloride salt was prepared with ethereal hydrogen chloride and crystallized from an isopropanol:ether mixture. It had M.P. 160–161° C. Analysis confirmed the empiric formula $C_{15}H_{24}NOCl$.

Example 2
4-BENZYLAMINOMETHYLCYCLOHEXANE METHYLCHLORIDE 4-benzylaminomethylcyclohexane methanol (43.7 g.) dissolved in chloroform was treated with thionyl chloride (45 ml.). The mixture was refluxed for 14 hours then the chloroform and excess thionyl chloride was removed in vacuo. The residue was crystallized from isopropanol to yield the hydrochloride salt of the title compound. It had M.P. 230–230.5° C. Analysis confirmed the empiric formula $C_{15}H_{23}NCl_2$.

The title compound was prepared from its hydrochloride salt in the usual manner. It had λmax. 258 mμ (ε=212).

Example 3
1-BENZYLAMINOMETHYL, 4-BENZYLTHIOMETHYL-CYCLOHEXANE (COMPOUND I)

α-toluenethiol (9.32 g.) was dissolved in 70% ethanol containing sodium hydroxide (6.16 g.). 4-benzylaminomethylcyclohexanemethylchloride hydrochloride (22 g.) was dissolved in 1:1 ethanol:water and added dropwise to the above mixture which was then refluxed for 30 minutes. The ethanol was removed in vacuo and the aqueous solution extracted with benzene to yield the title compound in 91% yield as an oil, λmax. 250 mμ (ε=805). A hydrochloride salt was prepared in the usual manner and crystallized from methanol-ether. It had M.P. 188–190° C. Analysis confirmed the empiric formula $C_{22}H_{29}NSCl$.

Example 4
4-(o-CHLOROBENZYLAMINOMETHYL)-CYCLOHEXANE METHANOL o-chlorobenzaldehyde (42.3 g.) and 4-aminomethylcyclohexanemethanol were converted to the Schiff base by refluxing in benzene until the theoretical volume of water had been removed azeotropically. The crude Schiff base was converted to the title compound by sodium borohydride reduction in the usual manner. It had λmax. 265 mμ (ε=214). A hydrobromate salt was prepared and crystallized from methanol-ether. It had M.P. 146–148° C. Analysis confirmed the empiric formula $C_{15}H_{24}NOClBr$.

Example 5
4-(o-CHLOROBENZYLAMINOMETHYL)-CYCLOHEXANE METHYLCHLORIDE 4-(o-chlorobenzylaminomethyl)-cyclohexane methanol (48.5 g.) was dissolved in chloroform and thionyl chloride (45 ml.) added dropwise over a period of one hour. The mixture was refluxed for 14 hours and then the excess thionyl chloride and the chloroform were removed in vacuo. The residue was distributed between benzene and aqueous alkali and the benzene solution fractionated to yield the title compound (20.9 g.) as an oil, B.P. 168°/0.75 mm. A hydrochloride salt was prepared in the usual manner. It had M.P. 209–210° C. Analysis confirmed the empiric formula $C_{15}H_{22}NCl_3$.

Example 6
1-BENZYLTHIOMETHYL, 4-(o-CHLOROBENZYLAMINO-METHYL)-CYCLOHEXANE (COMPOUND IV)

4-(o-chlorobenzylaminomethyl)-cyclohexane methyl chloride (20.9 g.) dissolved in 50% ethanol (50 ml.) was added dropwise to a mixture of benzylmercaptan (8.03 g.) and sodium hydroxide (2.6 g.) of 50% ethanol (150 ml.). The mixture was refluxed overnight, the ethanol removed and the residue extracted with chloroform. The chloroform solution was washed with 5% sodium hydroxide and water then dried ($Na_2SO_4$) to yield the title compound as an oil. It had bands in the infrared at 1050 cm.$^{-1}$, 1500 cm.$^{-1}$ and 700 cm.$^{-1}$. The hydrobromide salt was prepared and crystallized from an isopropanol-ether mixture. It had M.P. 114–116° C. Analysis confirmed the empiric formula $C_{22}H_{29}NClBrS$.

Example 7
1-BENZYLAMINOETHYL, 4-BENZYLTHIOMETHYLCYCLO-HEXANE,S-OXIDE (COMPOUND II)

Sodium metaperiodate (2.59 g., 0.012 mole) was dissolved in water to a final concentration of 0.5 M. The solution was cooled to 0° C. and 1-benzylaminomethyl, 4-benzylthiomethylcyclohexane (4.3 g., 0.011 mole) dissolved in water (20 ml.) was added with stirring over a period of 10 minutes. The mixture was stirred at 0° C. for an additional 7 hours, made alkaline with aqueous sodium hydroxide and extracted with ether to yield the title compound (4.0 g.) as a solid which had a strong band in the infrared at 1030 cm.$^{-1}$. The hydrochloride salt was prepared in ether and crystallized from isopropanol. It had M.P. 218–220° C. Analysis confirmed the empiric formula $C_{22}H_{30}NSOCl$.

Example 8

1-BENZYLAMINOMETHYL, 4-BENZYLSULPHONYL-METHYL CYCLOHEXANE (COMPOUND III)

1-benzylaminomethyl, 4-benzylthiomethyl cyclohexane hydrochloride (5.5 g.) was dissolved in glacial acetic acid. To this solution was added 30% hydrogen peroxide (3.8 ml.) and the mixture warmed on the steam bath for 4 hours. The acetic acid was removed in vacuo and the residue distributed between chloroform and 20% sodium hydroxide. The chloroform layer yielded the title compound, $\lambda$max. 259 m$\mu$ ($\epsilon$=418). The hydrochloride salt was prepared in the usual manner and crystallized from methanol-ether. It had M.P. 251–253° C. Analysis confirmed the empiric formula $C_{22}H_{30}NSO_2Cl$.

I claim:

1. A compound selected from the group which consists of bases of the formula

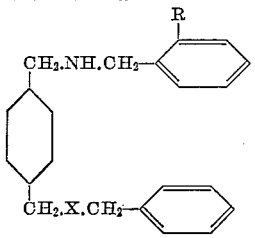

wherein R is selected from the group of radicals consisting of hydrogen and chlorine, and X is selected from the group of radicals consisting of —S—, —SO—, and —SO$_2$—; and acid addition salts of said bases with hydrohalic acids selected from the group which consists of hydrochloric acid and hydrobromic acid.

2. 1-benzylaminomethyl, 4-benzylthiomethylcyclohexane.

3. 1-benzylaminomethyl, 4-benzylthiomethylcyclohexane, S-oxide.

4. 1-benzylaminomethyl, 4-benzylsulphonylmethylcyclohexane.

5. 1-benzylthiomethyl, 4-(o-chlorobenzylaminomethyl)-cyclohexane.

6. The hydrochloride salt of 1-benzylaminomethyl, 4-benzylthiomethylcyclohexane.

7. The hydrochloride salt of 1-benzylaminomethyl, 4-benzylthiomethylcyclohexane, S-oxide.

8. The hydrochloride salt of 1-benzylaminomethyl, 4-benzylsulphonylmethyl cyclohexane.

9. The hydrobromide salt of 1-benzylthiomethyl, 4-(o-chlorobenzylaminomethyl)-cyclohexane.

No references cited.